United States Patent [19]

Birch

[11] Patent Number: 5,071,217
[45] Date of Patent: Dec. 10, 1991

[54] PRECISION FOCUSING AND LOCATING COLLAR FOR A FIBER OPTIC CONNECTOR

[76] Inventor: Thomas F. Birch, 5407 Plymouth Meadows Ct., Fairfax, Va. 22032-3220

[21] Appl. No.: 514,246

[22] Filed: Apr. 25, 1990

[51] Int. Cl.⁵ .............................................. G02B 6/32
[52] U.S. Cl. .................................... 385/33; 385/79
[58] Field of Search ................ 350/96.1, 96.15, 96.18, 350/96.2, 96.29, 320

[56] References Cited

U.S. PATENT DOCUMENTS

| 3,779,628 | 12/1979 | Kapron et al. | 350/96.15 |
| 4,810,053 | 3/1989 | Woith | 350/96.2 |
| 4,844,580 | 7/1989 | Lynch et al. | 350/96.18 |

FOREIGN PATENT DOCUMENTS 1-314212  12/1989  Japan .............................. 350/96.18

OTHER PUBLICATIONS

"Distributed-Index Planar Microlens," *Optical Devices and Fibers*, vol. 5, Ed. Y. Suematsu, New York: North-Holland, 1983, Chap. 2.4, pp. 142-150.
"Stacked Planar Integrated Optics," *Optical Devices and Fibers*, vol. 11, Ed. Y. Suematsu, New York: North-Holland, 1984, Chap. 2.5, pp. 141-151.
"Fiber Connectors, Splices and Couplers," *Fiber Optics: Advances in Research and Development*, Eds. Bendow and Mitra, New York: Plenum Press, 1979, pp. 437-473.

Primary Examiner—John D. Lee
Assistant Examiner—John Ngo
Attorney, Agent, or Firm—Burns, Doane, Swecker & Mathis

[57] ABSTRACT

An integrated lens and positioning mechanism for an optical fiber involving a convex surface on a optically transparent precision collar formed around the end of the fiber. The optically transparent collar has an index of refraction less than or equal to that of the fiber's surface. The fiber extends through the collar and is located at the optical center of the collar. The convex surface focuses light on the optical fiber within the collar thus increasing the amount of light collected in the core of the fiber. The collar has specific dimensions to allow precise positioning in a suitable locating body. A stray light suppressor may be formed behind the collar along the optical path of the fiber to remove unwanted light.

33 Claims, 3 Drawing Sheets

PRECISION FOCUSING AND LOCATING COLLAR FOR A FIBER OPTIC CONNECTOR

BACKGROUND OF THE INVENTION

1. The Field of the Invention

This invention relates in general to fiber optics, and in particular to devices and methods of coupling optical fibers to light sources of light responsive circuits or other optical fibers.

2. Description of Related Art

Optical fibers are flexible transparent fiber devices used for either image or information transmission in which light is propagated by total internal reflection. In simplest form, the optical fiber or light guide consists of a core of material with a refractive index higher than the surrounding cladding.

There are three basic types of optical fibers. In a multimode, stepped-refractive-index-profile fiber, the number of rays of light which are guided, and thus the amount of light coupled into the light guide is determined by the core size and the core-cladding refractive index difference. Such fibers, used for conventional image transfer, are limited to short distances for information transmission due to pulse broadening. An initially sharp pulse made up of many modes broadens as it travels long distances in the fiber, since the high-angle modes have a longer distance to travel relative to the long-angle modes. This limits the bit rate and distance because it determines how closely input pulses can be spaced without overlap at the output end.

The graded index multimode fiber, where the core refractive index varies across the core diameter, is used to minimize pulse broadening due to intermodal dispersion. Since light travels more slowly in the high index region of the fiber relative to the low index region, significant equalization of the transit time for the various modes can be achieved to reduce pulse broadening. This type of fiber is suitable for intermediate-distance, intermediate-bit-rate transmissions systems. For both fiber types, light from a laser or light emitting diode can be effectively coupled into the fiber.

A single-mode fiber is designed with a core diameter refractive index distribution such that only one mode is guided, thus eliminating intermodal pulse-broadening effects. Interior waveguide dispersion effects cause some pulse broadening, which increases with the spectral width of the light source. These fibers are best suited for use with a laser source in order to effectively couple light into the small core of the light guide, and to enable information transmission over long distances at very high bit rates. The specific fiber design and ability to manufacture it with controlled refractive index and dimensions determines the ultimate bandwidth or information carrying capacity.

The problem of joining fibers together or joining fibers to light emitters or light receivers, has been approached in two ways. For permanent connections, the fibers can be spliced together by carefully aligning the individual fibers and then epoxying them together or fusing them together. In fact, permanent connection of fiber ribbons (linear array of several fibers) can be achieved by splicing the entire ribbon as a single unit. For temporary connections, or for applications in which it is not desirable to make splices, fiber connectors have been developed. In order to provide further background information so that the invention may be completely understood and appreciated in its proper context, reference is made to the following prior art patents and publications.

U.S. Pat. No. 3,779,628 to Karpon et al discloses an optical waveguide light source coupler for coupling a large coherent light source to an optical fiber. A feature of this design is the frusto-conic core of the coupler. The front of the coupler is flat, allowing a flat emitter such as a diode laser, to be attached directly to the coupler. The cladding of the optical fiber serves only to internally refract light into the core. This coupler has only two distinct layers of material with different refractive indices, and is interposed between the end of the fiber and the light source.

U.S. Patent No. 4,844,580 to Lynch et al discloses a combination lens and sleeve made from a glass capillary tube. The end of the tube is melted with a flame as it is rotated to form the lens that focuses the light on the end of the fiber. The conical cavity between the end of the fiber and the bulbous end must be filled with an index matching fluid or glue to make the design effective. Light is only propagated into the fiber at the end of the fiber. The bulbous lens sleeve is manufactured separately and must be fitted over the end of the fiber, thus requiring a number of processing steps.

*Fiber Optics, Advances in Research and Development*, ed. B. Benden et al, pp. 437–473, (Plenum Press 1978) surveys a B. Benden et al, number of related designs of devices for centering optical fibers within connector bodies. As identified in the above-cited book, fiber connectors suffer from ray transfer loss due to the misalignment of the coupled optical fibers. Three types of misalignment can exist: end separation, axial displacement, and axial angular tilt. The misalignment losses aggregate and contribute to coupling inefficiency. Furthermore, Fresnel reflections add to the cumulative effect of the coupling losses. These losses can be quite substantial and highlight the need for accurate coupling of the optical fibers. A subsection entitled "Precision Transfer Molded Single Fiber Optic Connector" discusses a method of forming precision molded thermoplastic plugs directly on the optical fiber. The only properties of interest are mechanical, e.g., shrinkage, abrasion resistance, ease of production, and precision. Since this design optimizes optical fiber alignment, any optical transmissions within the plug constitute undesirable cross-talk.

The prior art does not disclose a large scale fiber optic wiring harness and particularly a harness for coupling a relatively large light source wherein the light source energy may be incoherent and polychromatic. A large scale fiber optic wiring harness typically consists of a one-dimensional row of coupled optical fibers or a matrix of optical fibers. Applications of these types of harnesses include image transfer and data transfer. There are two basic types of image transfer techniques. The first technique involves scanning a row of fiber optics in a harness over an image so that the row harness transfers discrete lines of image data. The second type of harness is the matrix harness in which a plurality of fibers are aligned in rows and columns and the entire image is or substantial portions thereof are transferred simultaneously on a pixel by pixel basis. Due to the large number of fiber connectors involved, the process of coupling the fibers to the retaining bracket must be automated to be economically viable.

One object of the present invention is to efficiently condense the light energy into an optical fiber and be manufactured continuously on a large scale to realize a lower cost than other designs. Of the above cited references, none of them achieves or fulfills the purposes of the precision focusing and locating collar of the present invention.

Accordingly, it is another object of the present invention to achieve the efficient collection of incoherent polychromatic light energy from a diffuse source into a fiber optic waveguide.

It is yet another object of the present invention to allow the collecting end of the fiber optic waveguide to be easily and precisely located in a retaining body.

SUMMARY OF THE INVENTION

In fulfillment and implementation of the previously recited objects, a primary feature of the invention resides in the provision of a unique coupling arrangement for coupling light from a large source via an integrated lens surface through the cladding of an optical fiber with the core of said fiber.

The coupling mechanism of the present invention is useful in communications systems comprising multiple sections of optical fibers for connecting those optical fibers. The coupling mechanism of the present invention is also useful for concentrating light from a large defuse source into an optical fiber. In accordance with the present invention the connector is characterized in that it comprises an optical fiber onto which a collar has been formed by transfer or injection molding, said collar having specific dimensions and the optical fiber precisely located therein.

Also disclosed is a method of manufacturing a focusing and locating device for an optical waveguide including the steps of drawing a continuous length of optical waveguide, molding one or more collars of optically transparent material with a refractive index that is equal to or lower than the refractive index of the surface of the waveguide wherein the collar has a convex surface on an end. Thereafter, the waveguide is cut immediately adjacent the convex end of the collar thereby establishing a precise relationship between the waveguide and the convex surface of the collar. The convex surface of the collar focuses light energy onto the core of the waveguide at an incident angle at or less than the acceptance angle of the waveguide to thereby cause the light energy to be introduced into and internally reflected along the core of the waveguide. It will be appreciated that this facilitates the manufacture of the focusing and locating device since a plurality of collars can be formed on one continuous fiber; the fiber, complete with coupler, being cut to length at a later time. Further, since the collar is formed on a continuous fiber, alignment is greatly enhanced since the fiber can be drawn taut, the mold clamped over the fiber and the collar formed by either transfer or injection molding. Since the fiber passes through the collar, it is unnecessary to provide a post assembly step which might involve index matching fluid, alignment errors and extensive manufacturing techniques as in the prior art.

Optical concentration is achieved because the collar is composed of an optically transparent material of an equal or lower refractive index than the refractive index of the surface of the optical fiber and because the terminal surface is convex.

DESCRIPTION OF THE PREFERRED EMBODIMENTS

Figure 1:
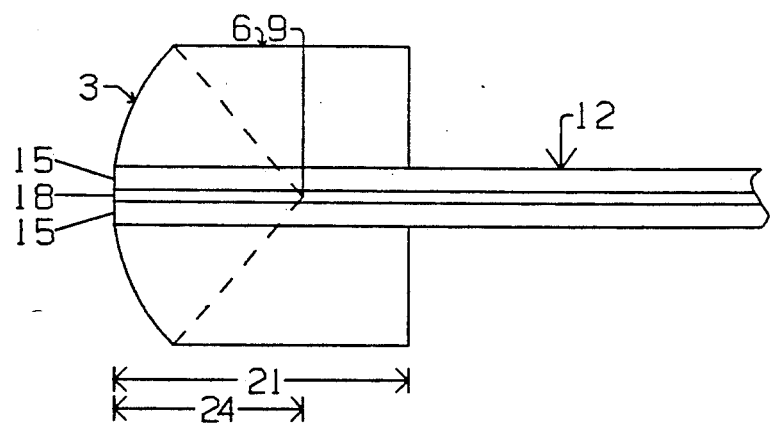
FIG. 1 is a cross-sectional view of a step index type optical fiber with a collar and integrated lens.

FIG. 1 shows the lens portion of an optical condensing system for coupling a diffuse optical energy input source (not shown) to the input end of a fiber optic waveguide 12. The collar 6 consists of a precision transfer or injection molded transparent material with a refractive index greater than the surrounding medium but less than or equal to the optical fiber cladding 15 on which it is formed. The collar 6 may have a multimode graded index or fixed index of refraction. The cross section of the collar 6 is preferably round, but may also be any polygon depending on the application. The terminal end of the collar 6 is formed into a convex surface 3 and serves to focus diffuse optical energy onto the optical fiber 12.

The optical fiber 12 is composed of a core 18 of an optically transparent material of a given refractive index and cladding 15 of another transparent material but with a lower refractive index than said core 18. The convex surface 3 has a focal point 9 and a focal length 24. The collar 6 has an overall length 21 which is equal to or longer than the focal length 24 of the convex surface 3. The dashed lines from the convex surface 3 to the focal point 9 are for the purpose of illustrating the focal point 9, and do not outline an optical path. A basic principle of operation is that light energy is collected by the convex surface 1 which acts like a lens by focusing the light on the core 18 of the optical fiber 12. If the light source is not collimated or is polychromatic, then the preferred convex surface 3 will be parabolic with an antireflective coating to suppress Fresnel reflections. The light is focused onto the core of the optical fiber at an incidence angle less than or equal to the acceptance angle thereby causing light energy to be introduced into and internally reflected along the core of the fiber.

Figure 2:
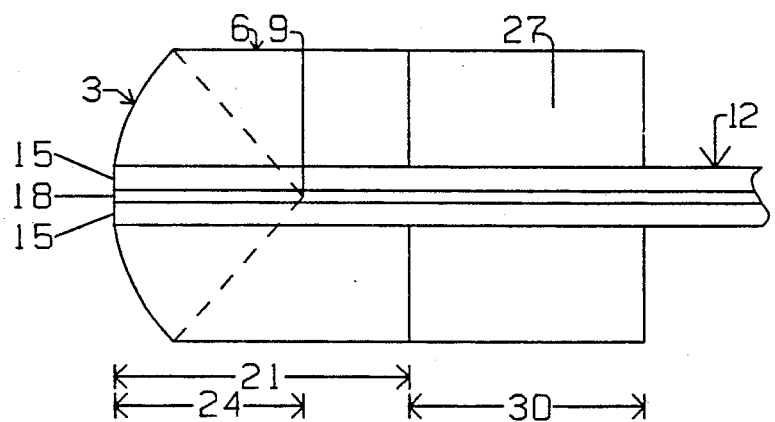
FIG. 2 shows a cross-sectional view of an alternative embodiment wherein a cladding mode suppressing collar has been added.

In FIG. 2, as in all subsequent figures, the numbering assignments of FIG. 1 are carried forward to show the similarity of the alternative embodiments of the present invention. FIG. 2 is similar to FIG. 1 except that a cladding mode suppressor 27 has been added. A "mode" is an optical path. Different modes have different lengths, hence take different amounts of time to travel thus causing a signal to spread out in time, as explained above. The suppressor 27 is desirable because the convex surface 3 collects light energy with a large cross-section, hence propagates numerous modes into the collar. If a step index optical waveguide 12 is used, then there will be some reflection at the interfaces between the materials with different refractive indices. Preferably, the cladding mode suppressor 27 has an inverse gradient index where the index of refraction increases from matching the cladding 18 outward to a high index of refraction near its surface. Additionally or alternatively, a dye can be diffused into the surface of the cladding mode suppressor 27 to directly absorb the stray light energy or antireflective coatings applied to scatter the i to outside of the suppressor 27. The dimensions, such as the length 30, of the cladding mode suppressor depend on numerous factors such as the wave length(s) of the input light, the optical fiber 12 dimensions, the number of modes to be suppressed, and whether or not the optical fiber 12 is a step index or a gradient index type, among others. The simplest, effective construction is depicted in FIG. 2. The undesirable modes are propagated away from the optical fiber 12 and pass out of the rear and sides of the cladding mode suppressor 27.

Figure 3:
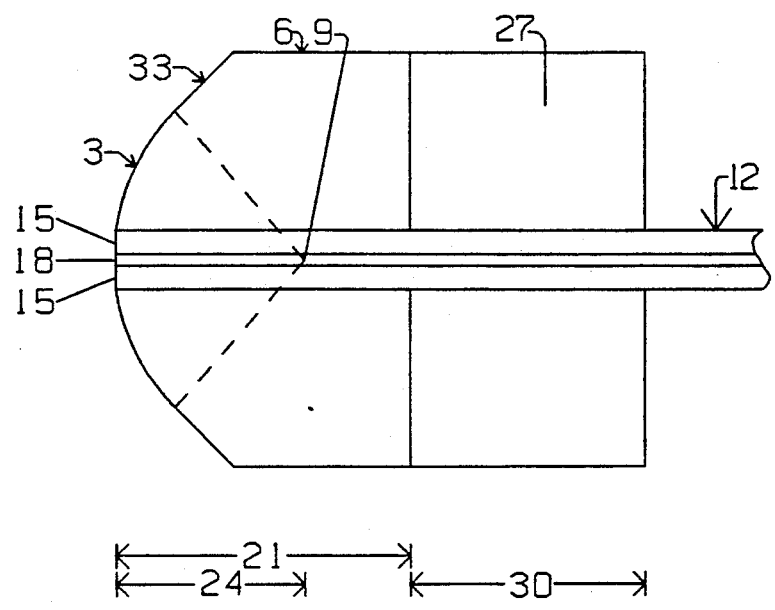
FIG. 3 is a cross-sectional view of an alternative embodiment wherein a concentric locating surface has been added in addition to a cladding mode suppressing collar.

The embodiment shown in FIG. 3 is optically identical to FIG. 2, but the collar 6 has been enlarged to allow for a precision frusto-conic locating surface 33 to be added. The frusto-conic locating surface 33 is used to precisely position the present invention in a suitable receiving body.

Figure 4:
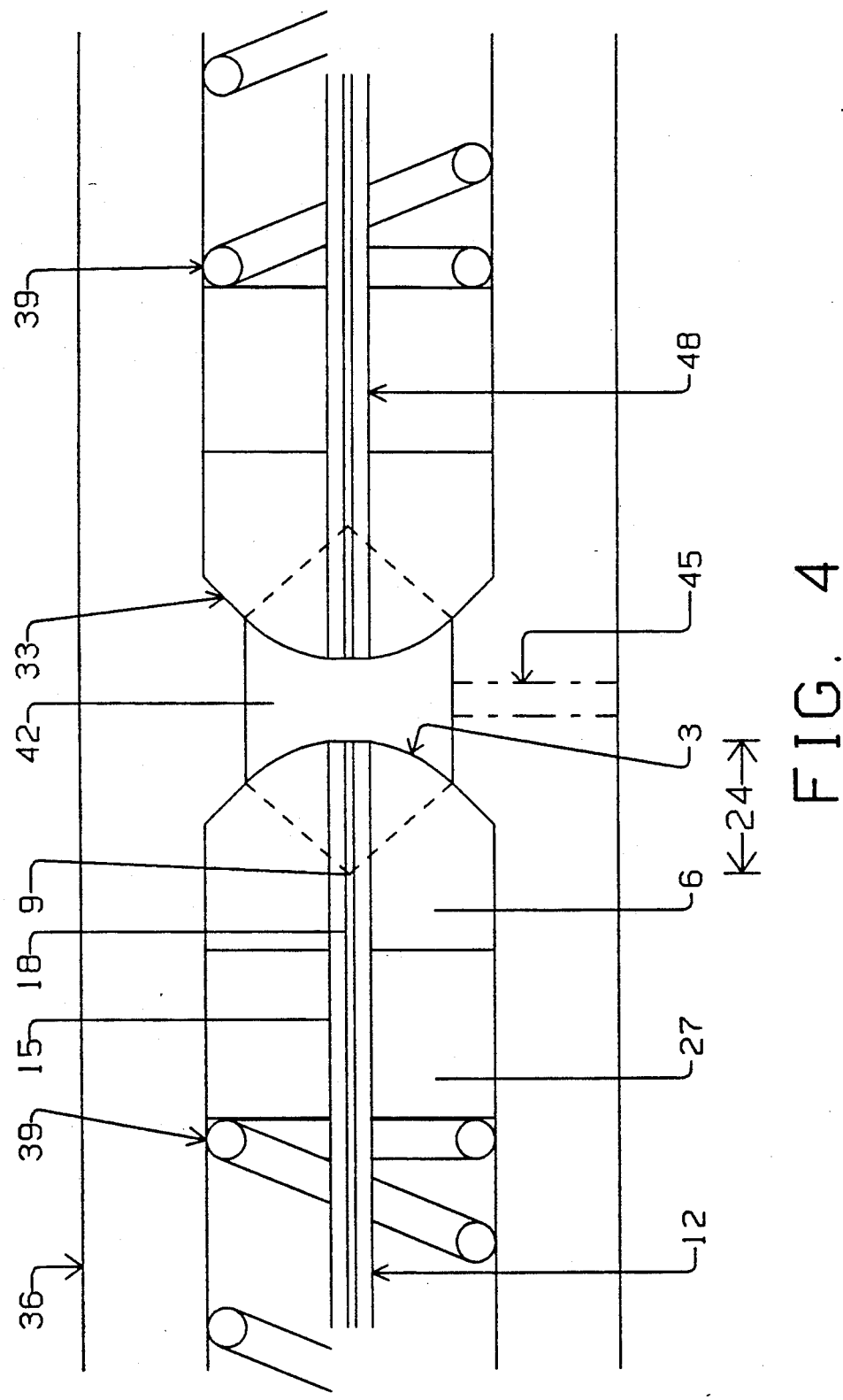
FIG. 4 shows a cross-sectional view of a locating body with one collared optical fiber and another suitably located fiber inserted therein.
Figure 5:
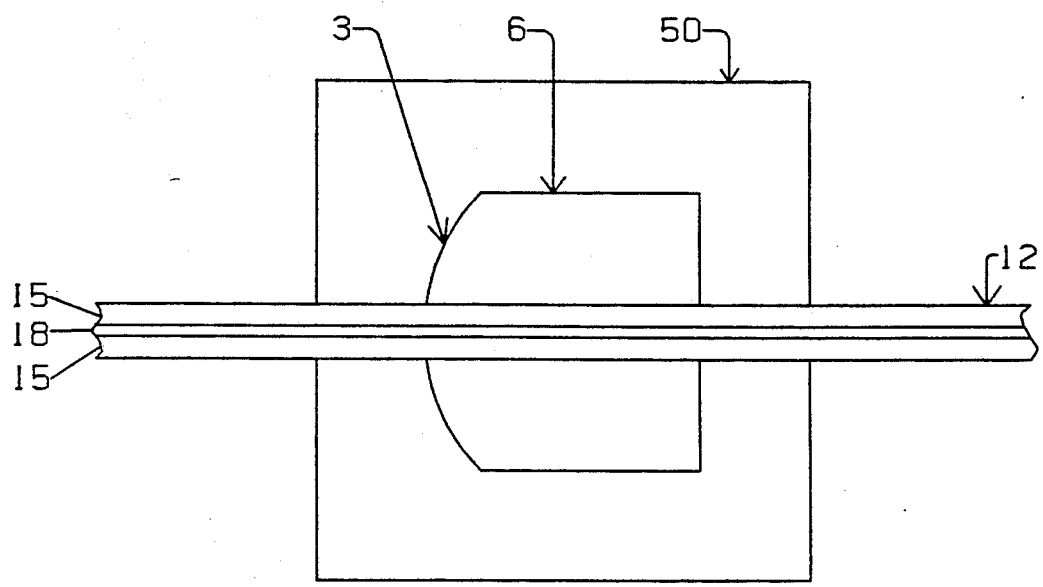
FIGS. 5 and 6 illustrate the manufacturing technique for producing the coupler of the present invention.
Figure 6:
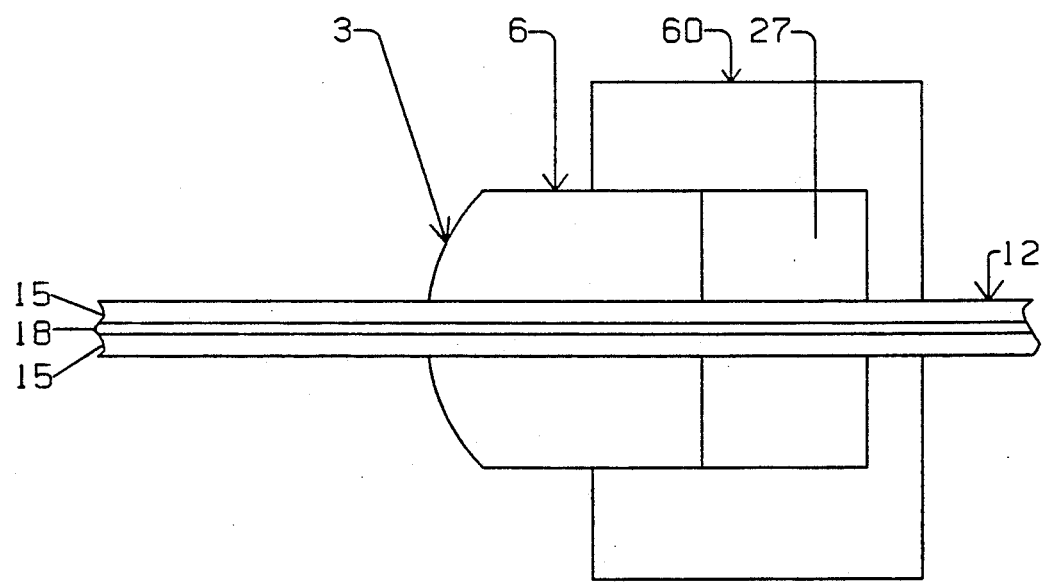

An example of a connector receiving body is depicted in FIG. 4, and for the sake of clarity, is obviously not drawn to scale. FIG. 4 is a drawing of a biconic fiber optical connector similar to a type that is commercially available, but omits several aspects, such as a fiber sheath clamp. The connector receiving body 36 is called biconic because both optical fibers, the optical source fiber 12 and the collecting optical fiber 48, are positioned by a conic surface 33. This connector receiving body 36 differs from commercial connectors in that the central cavity 42 is large enough to accommodate the convex surface 3. An optional port 45 for adding index matching fluid or adhesive to the cavity 42 is shown. If an index matching fluid or an antireflective layer applied to the convex surface 3 is used, then the loss due to Fresnel reflections can be nearly eliminated. If the connection is dismountable, then only the springs 39 hold the collared fibers in the connector receiving body 36. The springs 39 are retained in the connector body 36 by means not shown. If the light energy is only being transferred in one direction, then the source optical fiber 12 may be retained in any of a number of different types of ferrules. FIG. 4 shows a bidirectional connection wherein light can be transferred in either direction. The spring 39 not only hold the collars 6 in place, they also act as thermal compensators in the dismountable design. Unlike other refocusing designs, the separation distance between the fiber ends is not critical in the present invention.

The preferred method of manufacture is by precision transfer molding. In this process, the halves of a split mold 50 are filled with a thermosetting compound and then pressed together around the fiber 12. The molded piece is then withdrawn from the mold for trimming. The collar 6 can also be injection molded onto the fiber 12. In both cases the fiber 12 is not cut until after the collar 6 has been formed, meaning that the fiber 12 may be pulled in a continuous process.

Stated in chronological order, the method of manufacturing the focusing and locating device entails (1) drawing a continuous length of optical fiber, (2) tensioning the fiber so that it is substantially linear, (3) clamping a mold about the fiber, the mold either being filled with a thermosetting compound under the transfer molding process or a compound is injected into the mold. After the compound has set, the mold is (4) removed and the fiber is (5) trimmed.

Trimming may be accomplished by one of two principal methods; the score and pull technique, and the polishing technique. The score and pull technique involves scoring the fiber surface and then exerting a tensile force along the fiber. A fracture commences at the score site due to the leverage action of bending the fiber. A mirror finish can be achieved by controlling the applied forces. Thus, after the collar has been molded on the fiber, the assembly is removed from the mold and a score mark is etched on the fiber at the juncture of the fiber to the convex surface of the collar. The protruding fiber is then bent in a direction opposite to the score and the fiber is cloven to provide a mirror finish normal to the axis of the fiber and collar.

The polishing method is the preferred method of preparing the end of the fiber 12. This is due to the fact that, by the method of polishing, the fiber end to be polished must be embedded in a supporting material and held in a suitable jig to ensure that the finished surface is normal to the fiber axis. The collar provides such a supporting material. This method also improves the juncture between the end of the fiber and the pinnacle of the convex surface.

Suppressor 27 is formed by much the same process as is the collar. After the collar is formed on the fiber 12, a second mold 60 is clamped about the fiber 12 and the collar 6 such that one side of the second mold 60 form fits the rear surface and sides of the collar and the other side of the second mold 60 clamps about the fiber 12. A thermosetting compound is either present in the mold at the time of clamping or injected therein to form the suppressor 27 immediately adjacent and behind the collar 6. Note that one side of the second mold 60 cavity is formed by the rear surface of the collar 6 thereby assuring an optically acceptable junction between the collar 6 and the suppressor 27.

The connector as described above is useful for a variety of applications. Examples include: polygonal collars stacked together to concentrate light for, e.g., an automotive headlamp; prefabricated harnesses for illuminating gauges or collecting information optically; prefabricated harnesses for transmitting optically encoded data as in a computer local area network; conducting or transforming images in phototypesetting. Naturally, the invention is useful using any of the three basic types of optical fibers mentioned above and additionally any suitable type of wave guide. The present invention may be used to transfer any type of optical light, e.g., infrared and visible, by selecting appropriate known optical materials.

The preceding description shall not be construed as limiting the ways in which this invention may be practiced but shall be inclusive of many other variations that do not depart from the broad scope and intent of the invention.

What is claimed is:

1. A focusing and locating device for an optical waveguide having a refractive index and forming an exterior surface, said focusing and locating device comprising:

a first collar of optically transparent material with a fixed refractive index that is equal to or less than the refractive index of the surface of said waveguide, said first collar being disposed on said waveguide; and an end of said first collar adjoining an end of said waveguide forming a convex surface;

said first collar establishing a predetermined relationship between said waveguide and said convex surface;

said convex surface being arranged to focus light energy onto the core of said waveguide at an incident angle less than or equal to the acceptance angle of said waveguide thereby causing the light energy to be introduced into an internally reflected along said core of said waveguide.

2. A focusing and locating device in accordance with claim 1 further comprising a second collar of an optically transparent material with a fixed refractive index that is equal to or greater than the refractive index of the surface of said waveguide, said second collar being disposed on said waveguide behind said first collar along an optical path of said optical waveguide.

3. A focusing and locating device in accordance with claim 1 further comprising a second collar of an optically transparent material with a radially increasing refractive index that is equal to or greater than the refractive index of the surface of said waveguide, said second collar being disposed on said waveguide behind said first collar along an optical path of said optical waveguide.

4. A focusing and locating device in accordance with claim 1 wherein a radius of said first collar is greater than the radius of said convex surface, and a frusto-conic locating surface joining the convex surface and the other edge of said first collar.

5. A focusing and locating device for an optical waveguide of transparent material with a refractive index that decreases from its center to its side surface, said focusing and locating device comprising:
a first collar of optically transparent material with a refractive index that is equal to or less than the refractive index of the side surface of said waveguide and is constant,
said first collar establishing a predetermined relationship between said waveguide and a surface of said first collar, and
an end of said first collar adjacent an end of said waveguide being a convex surface, said convex surface being arranged to focus light energy into the center of said waveguide at an incident angle less than or equal to the acceptance angle of said side surface of said waveguide thereby causing the light energy to be introduced into and reflected along the center of said waveguide.

6. A focusing and locating device in accordance with claim 5 further comprising a second collar of optically transparent material with a fixed refractive index that is equal to or greater than the refractive index of the surface material of said waveguide, said second collar being disposed on said waveguide behind said first collar along an optical path of said waveguide.

7. A focusing and locating device in accordance with claim 5 further comprising a second collar of optically transparent material with a radially increasing refractive index that is equal to or greater than the refractive index of the surface material of said waveguide, said second collar being disposed on said waveguide behind said first collar along an optical path of said waveguide.

8. A focusing and locating device in accordance with claim 5 wherein the radius of said first collar is greater than the radius of the convex surface, and a frusto-conic locating surface being interposed between the convex surface and an outer edge of said first collar.

9. A focusing and locating device for an optical waveguide of transparent material with a refractive index, said focusing and locating deice comprising:

a first collar of optically transparent material having an inner surface with a refractive index equal to or less than a refractive index of the surface of said waveguide and decreases toward an outer surface, disposed on said waveguide,
said first collar establishing a predetermined relationship between said waveguide and a surface of said first collar, and
an end of said first collar adjoining an end of said waveguide being a lens arranged to focus light energy into the center of said waveguide at an incident angle less than or equal to the acceptance angle of said waveguide thereby causing the light energy to be introduced into and reflected along the center of said waveguide.

10. A device in accordance with claim 9 further comprising a second collar disposed on said waveguide behind said first collar along an optical path of said waveguide, said second collar being formed of optically transparent material with a fixed refractive index that is equal to or greater than the refractive index of the surface material of said waveguide.

11. A device in accordance with claim 9 further comprising a second collar disposed on said waveguide behind said first collar along an optical path of said waveguide, second collar being formed of optically transparent material with a radially increasing refractive index that is equal to or greater than the refractive index of the surface material of said waveguide.

12. A device in accordance with claim 9 wherein the radius of said first collar is greater than the radius of said lens, and further comprising a frusto-conic locating surface interposed between the convex surface and an outer edge of said first collar.

13. A device in accordance with claim 9 wherein said end of said first collar adjoining said end of said waveguide is a convex surface.

14. A focusing and locating device for an optical waveguide having a core of transparent material clad with transparent material of lower refractive index than said core and forming an exterior surface, said focusing and locating device comprising:
a first collar of optically transparent material with a graded refractive index that is equal to or less than the refractive index of the surface of said waveguide, said first collar being disposed on said waveguide; and
an end of said first collar adjoining an end of said waveguide and forming a convex surface;
said first collar establishing a predetermined relationship between said waveguide and said convex surface;
said convex surface being arranged to focus light energy onto the core of said waveguide at an incident angle less than or equal to the acceptance angle of said waveguide thereby causing the light energy to be introduced into and internally reflected along said core of said waveguide.

15. A focusing and locating device in accordance with claim 13 further comprising a second collar of an optically transparent material with a fixed refractive index that is equal to or greater than the refractive index of the surface of said waveguide, said second collar being disposed on said waveguide behind said first collar along an optical path of said optical waveguide.

16. A focusing and locating device in accordance with claim 14 further comprising a second collar of an optically transparent material with a radially increasing refractive index that is equal to or greater than the refractive index of the surface of said waveguide, said second collar being disposed on said waveguide behind said first collar along an optical path of said optical waveguide.

17. A focusing and locating device in accordance with claim 14 wherein a radius of said first collar is greater than the radius of said convex surface, and a frusto-conic locating surface joining the convex surface and the outer edge of said first collar.

18. A method of manufacturing a focusing and locating device for an optical waveguide comprising the steps of:
   drawing a continuous length of optical waveguide, said waveguide having a core of optically transparent material clad with optically transparent material of lower refractive index and forming an exterior surface;
   molding at least one first collar of optically transparent material with a refractive index that is equal to or less than the refractive index of the surface of said waveguide, said first collar having an end forming a convex surface; and
   trimming said optical waveguide closely proximate to said convex surface of said first collar thereby establishing a predetermined relationship between said waveguide and said convex surface of said first collar,
   wherein said convex surface being arranged to focus light energy onto said core of said waveguide at an incident angle at or less than the acceptance angle of said waveguide thereby causing the light energy to be introduced into and internally reflected along said core of said waveguide.

19. The method of claim 18 further comprising the step of molding a second collar of an optically transparent material with a fixed refractive index that is equal to or greater than the refractive index of the surface of said waveguide, said second collar being disposed on said waveguide behind said first collar along an optical path of said optical waveguide.

20. The method of claim 18 further comprising the step of molding a second collar of an optically transparent material with a radially increasing refractive index that is equal to or greater than the refractive index of the surface of said waveguide, said second collar disposed on said waveguide behind said first collar along an optical path of said optical waveguide.

21. The method of claim 18, wherein the first collar is molded so that a radius of said first collar is greater than the radius of said convex surface and a frusto-conic locating surface is formed joining the convex surface and the outer edge of said first collar.

22. The method of claim 18 wherein said first collar is formed by injection molding.

23. The method of claim 18 wherein said first collar is formed by transfer molding.

24. A method of manufacturing a focusing and locating device for an optical fiber comprising the steps of:
   drawing a continuous length of optical waveguide of transparent material with a refractive index that is decreasing from the center to the surface of said optical waveguide;
   molding a first collar of optically transparent material, whose refractive index is equal to or less than the surface of said waveguide and is fixed onto said continuous length of optical waveguide, said first collar establishing a predetermined relationship between said waveguide and the surface of said first collar, and having the end of said first collar adjacent an end of said waveguide being a convex surface; and
   trimming said waveguide closely proximate to said convex surface of said first collar thereby establishing a predetermined relationship between said waveguide and said convex surface of said first collar, wherein said convex surface of said first collar focuses light energy into the center of said waveguide at an incident angle less than or equal to the acceptance angle of said waveguide thereby causing the light energy to be introduced into and reflected along the center of said waveguide.

25. A method in accordance with claim 24 further comprising the step of molding a second collar of an optically transparent material with a fixed refractive index that is equal to or greater than the refractive index of the surface material of said waveguide behind said first collar along an optical path of said waveguide.

26. A method in accordance with claim 24 further comprising the step of molding a second collar of an optically transparent material with a radially increasing refractive index that is equal to or greater than the refractive index of the surface material of said waveguide behind said device along an optical path of said waveguide.

27. A method in accordance with claim 24 wherein the first collar is molded of that the radius of said first collar is greater than the radius of the convex surface, and a frusto-conic locating surface formed between the convex surface and the outer edge of said first collar.

28. A method in accordance with claim 24 further comprising the step of molding a second collar on said waveguide behind said first collar along an optical path of said waveguide, said second collar being formed of an optically transparent material with a radially increasing refractive index that is equal to or greater than the refractive index of the surface material of said waveguide.

29. A method in accordance with claim 24 wherein said first collar is molded so that its radius is greater than the radius of said convex surface, and a frusto-conic locating surface being formed between the convex surface and an outer edge of said first collar.

30. A method of manufacturing a focusing and locating device for optical fiber comprising the steps of:
   drawing a continuous length of optical waveguide of transparent material with a refractive index that deceases from the center to the surface of said optical waveguide;
   molding a first collar on said waveguide and formed of optically transparent material with a refractive index equal to or less than the surface of said waveguide and decreases toward an outer surface of said first collar, said first collar establishing a predetermined relationship between said waveguide and a surface of said first collar, and having an end forming a front surface; and
   trimming said waveguide closely proximate to said front surface of said first collar thereby establishing a predetermined relationship between said waveguide and said front surface of said first collar, wherein said front surface of said first collar focuses light energy into the center of said waveguide at an incident angle less than or equal to the acceptance angle of said waveguide thereby causing the light energy to be introduced into and reflected along the center of said waveguide.

31. A method in accordance with claim 30 further comprising the step of molding a second collar on said waveguide behind said first collar along an optical path of said waveguide, said second collar being formed of an optically transparent material with a fixed refractive index that is equal to or greater than the refractive index of the surface material of said waveguide.

32. A focusing and locating device for an optical waveguide of transparent material with a refractive index, said focusing and locating device comprising:

a first collar of optically transparent material with a refractive index that is equal to or less than the refractive index of side surface of said waveguide, said first collar establishing a predetermined relationship between said waveguide and a surface of said first collar, and an end of said first collar adjacent an end of said waveguide constituting a lens, said lens being arranged to focus light energy into the center of said waveguide at an incident angle less than or equal to the acceptance angle of said side surface of said waveguide thereby causing the light energy to be introduced into and reflected along the center of said waveguide.

33. A focusing and locating device in accordance with claim 32 further comprising a second collar of optically transparent material with a refractive index that is equal to or greater than the refractive index of said waveguide, said collar being disposed on said waveguide behind said first collar along an optical path of said waveguide.

* * * * *